United States Patent
Reid et al.

(10) Patent No.: US 8,881,142 B1
(45) Date of Patent: Nov. 4, 2014

(54) DETERMINING AND USING PROBABLE INSTANCE LIFETIMES

(75) Inventors: Robert L. Reid, Seattle, WA (US); James A. G. Greenfield, Cape Town (ZA)

(73) Assignee: Amazon Technologies, Inc., Reno, NV (US)

( * ) Notice: Subject to any disclaimer, the term of this patent is extended or adjusted under 35 U.S.C. 154(b) by 427 days.

(21) Appl. No.: 13/165,261

(22) Filed: Jun. 21, 2011

(51) Int. Cl.
*G06F 9/455* (2006.01)
(52) U.S. Cl.
USPC .......................................................... 718/1
(58) Field of Classification Search
USPC .......................................................... 718/1
See application file for complete search history.

(56) References Cited

U.S. PATENT DOCUMENTS

| | | | |
|---|---|---|---|
| 2005/0120341 A1* | 6/2005 | Blumenthal et al. | 717/158 |
| 2010/0050172 A1* | 2/2010 | Ferris | 718/1 |
| 2010/0153945 A1* | 6/2010 | Bansal et al. | 718/1 |
| 2011/0060832 A1* | 3/2011 | Govil et al. | 709/225 |
| 2011/0072138 A1* | 3/2011 | Canturk et al. | 709/226 |
| 2011/0099548 A1* | 4/2011 | Shen et al. | 718/1 |
| 2011/0219372 A1* | 9/2011 | Agrawal et al. | 718/1 |

* cited by examiner

*Primary Examiner* — Emerson Puente
*Assistant Examiner* — Steven Do
(74) *Attorney, Agent, or Firm* — Baker Botts L.L.P.

(57) ABSTRACT

In certain embodiments, a computer-implemented method includes accessing a request to instantiate a virtual machine from a user, accessing virtual machine lifetime data, and determining, based at least in part on the virtual machine lifetime data, a probable lifetime for the virtual machine. The virtual machine lifetime data includes actual lifetime data for a prior virtual machine that was previously instantiated. The actual lifetime data indicates an amount of time that the prior virtual machine was operational.

20 Claims, 3 Drawing Sheets

DETERMINING AND USING PROBABLE INSTANCE LIFETIMES

BACKGROUND

Entities that provide computing resources over a communication network may allow a client to use, possibly for a fee, a certain amount of computing capacity on a computer system remote from a computing environment of the client. For example, a client may submit a request to create and operate a virtual machine running on a host server of the provisioned computing environment provider. Host computing systems on which to instantiate instances of computing capacity are typically chosen at random.

BRIEF DESCRIPTION OF THE DRAWINGS

For a more complete understanding of the present disclosure and its advantages, reference is made to the following descriptions, taken in conjunction with the accompanying drawings, in which.

DESCRIPTION OF EXAMPLE EMBODIMENTS

Provisioned computing environment providers often provide their users with the ability to instantiate and operate a virtual machine on a host computer system. For example, a user may request to instantiate and operate a virtual machine that consumes all physical computing resources of a host computer system. In another example, a user may request to instantiate and operate a virtual machine that consumes less than all of the physical computing resources of a host computer system. In situations where less than all of the physical computing resources of a host computer system are consumed by a single virtual machine, the host computer system may host multiple virtual machines that run simultaneously on the host computer system.

In some scenarios, a host computer system may need to be taken offline. For example, a host computer may need to be repaired, may need software or firmware updates, or may need a hardware upgrade (e.g., increased memory capacity, etc.). In order to take a host computer system offline, however, the provisioned computing environment provider typically must wait for all virtual machines that are currently running on the host computer system to be terminated or migrated to another host. This typically involves waiting for the users who requested the running virtual machines to terminate the virtual machines. This is undesirable because the lifetime of virtual machines are typically unknown and thus the provisioned computing environment provider does not know when all virtual machines will be terminated. In addition, the provisioned computing environment provider also typically ceases to instantiate any new virtual machines on a host computer system that is to be taken offline. This is undesirable because any unused computing capacity on a host system that is to be taken offline may remain unused while the provisioned computing environment provider waits for all running virtual machines to be terminated.

Certain embodiments of the present disclosure provide techniques for determining probable lifetimes of virtual machines that are to be instantiated on host computer systems. In certain embodiments, a probable lifetime of a requested virtual machine may be determined using various techniques, examples of which are described herein, and then utilized to determine a particular host computing system on which to instantiate the requested virtual machine. FIGS. 1 through 4 below illustrate systems and methods for determining probable virtual machine lifetimes and for determining a particular host computing system on which to instantiate virtual machines according to certain embodiments of the present disclosure.

Figure 1:
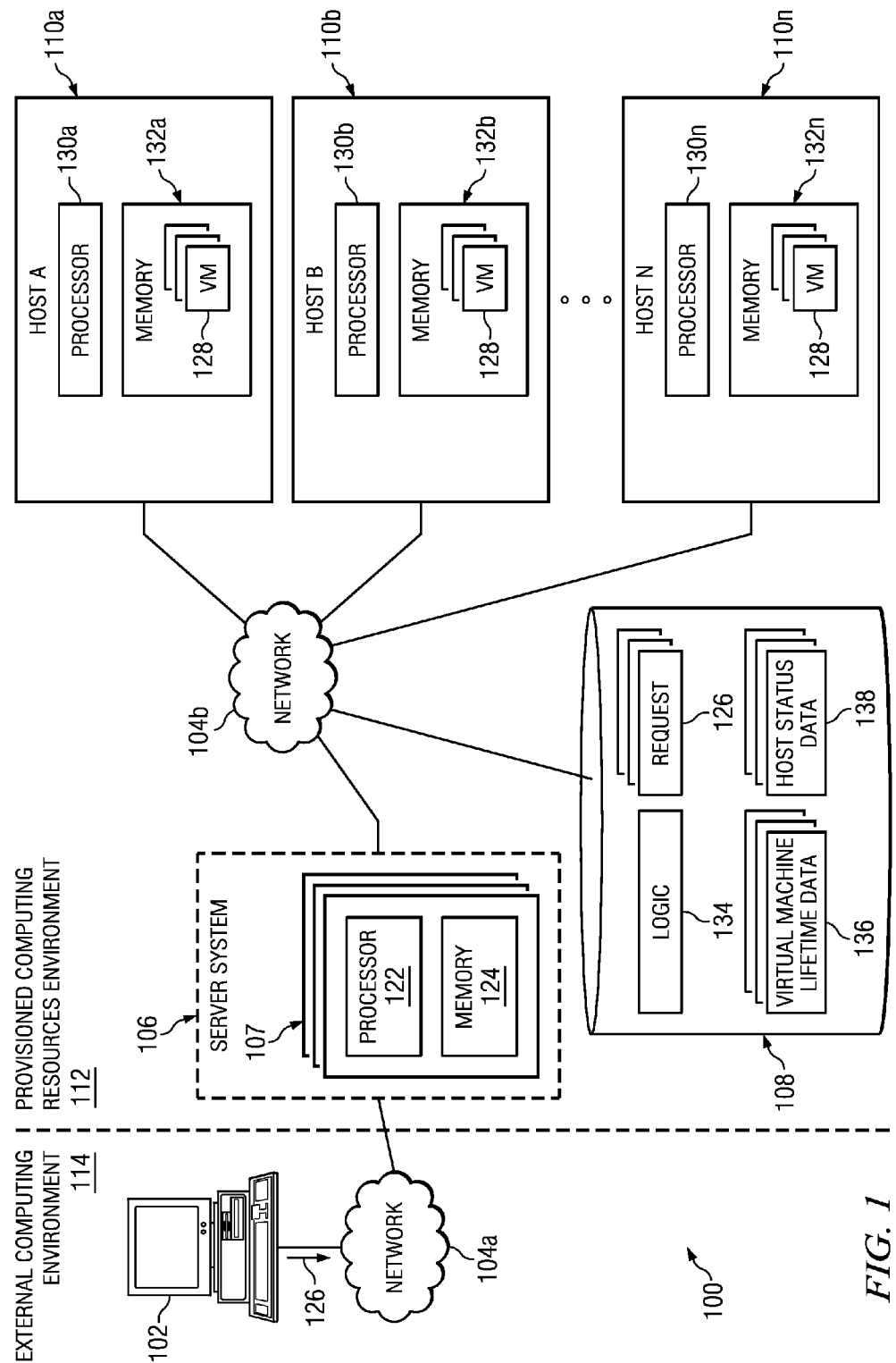
FIG. 1 illustrates an example system for determining probable virtual machine lifetimes and selecting a host computer system on which to instantiate virtual machines based on determined probable virtual machine lifetimes, according to certain embodiments of the present disclosure.

FIG. 1 illustrates an example system 100 for determining probable virtual machine lifetimes and selecting a host computer system on which to instantiate virtual machines based on determined probable virtual machine lifetimes, according to certain embodiments of the present disclosure. In the illustrated example, system 100 includes a user system 102, networks 104a and 104b, a server system 106, a storage unit 108, and one or more hosts 110. In certain embodiments, server system 106, storage unit 108, and hosts 110 may be communicatively coupled together over a high speed communication network such as network 104b and collectively may comprise a computing infrastructure, which may be referred to as a provisioned computing resources environment 112. User system 102 and/or network 104a may be external to provisioned computing resources environment 112 and may be referred to as an external computing environment 114. Although system 100 is illustrated and primarily described as including particular components, the present disclosure contemplates system 100 including any suitable components, according to particular needs.

In general, provisioned computing resources environment 112 (including, for example, one or more of server system 106, storage unit 108, and hosts 110) provides a collection of remote computing services offered over a network (which may or may not be network 104a). Those computing services may include any suitable combination of, for example, storage, compute processing, networking, applications, power, or any other suitable computing resources that may be made available over a network. In certain embodiments, entities accessing those computing services may gain access to a suite of elastic information technology (IT) infrastructure services (e.g., computing resources on hosts 110) as the entity requests those services. Provisioned computing resources environment 112 may provide a scalable, reliable, and secure distributed computing infrastructure.

To gain access to computing resources on hosts 110, a user such as an individual, a business, or an organization may utilize user system 102 to transmit a request 126 to provisioned computing resources environment 112. In general, request 126 indicates a desired configuration for a particular virtual machine to be instantiated on hosts 110. As an example, request 126 may indicate, among other things, an instance of a particular virtual machine 128 to be instantiated on hosts 110. After request 126 is transmitted by user system 102, provisioned computing resources environment 112 (e.g., server system 106 or a host 110) may access request 126, virtual machine lifetime data 136 (described below), and/or host status data 138 (described below) stored in storage unit 108 and determine a probable virtual machine lifetime for a virtual machine 128 that satisfies request 126. In some embodiments, provisioned computing resources environment 112 may additionally determine an appropriate host 110 on which to instantiate a virtual machine 128 associated with request 126. Virtual machine lifetime data 136 is described in more detail below. In particular, example embodiments of virtual machine lifetime data 136 are described below with reference to FIG. 2, and embodiments of determining probable virtual machine lifetimes and choosing a particular host on which to instantiate requested virtual machines are described below with reference to FIG. 3.

User system 102 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal data assistant (PDA), one or more Internet Protocol (IP) telephones, smart phones, table computers, one or more servers, a server pool, one or more processors within these or other devices, or any other suitable processing device. User system 102 may be a stand-alone computer or may be a part of a larger network of computers associated with an entity. Any entity may interact with user system 102 in order to gain access to computing resources on hosts 110. The term "entity" used herein includes, but is not limited to, any user, organization, business, corporation, firm, government entity, educational entity, computer system, and the like. Users of user system 102 may include any type of user, including users who pay a fee and users who use the computing resources of provisioned computing environment providers for free.

Networks 104a and 104b facilitate wireless or wireline communication. Networks 104a and 104b may communicate, for example, IP packets, Frame Relay frames, Asynchronous Transfer Mode (ATM) cells, voice, video, data, and other suitable information between network addresses. Networks 104a and 104b may include one or more personal area networks (PANs), local area networks (LANs), a wireless LAN (WLAN), a virtual private network (VPN), radio access networks (RANs), metropolitan area networks (MANs), wide area networks (WANs), mobile networks (e.g., using WiMax (802.16), WiFi (802.11), 3G, or any other suitable wireless technologies in any suitable combination), all or a portion of the global computer network known as the Internet, an extranet, a satellite network, and/or any other communication system or systems at one or more locations, any of which may be any suitable combination of wireless and wireline. Networks 104a and 104b may be combined, in whole or in part, or may be distinct, according to particular needs.

Server system 106 may include one or more computer systems 107 at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, one or more servers, a server pool, one or more processors within these or other devices, or any other suitable processing device. Server system 106 may be a stand-alone computer or may be a part of a larger network of computers associated with an entity.

Each computer system 107 of server system 106 may include processing unit 122 and memory unit 124. Processing unit 122 may include one or more microprocessors, controllers, or any other suitable computing devices or resources. Processing unit 122 may work, either alone or with other components of system 100, to provide a portion or all of the functionality of system 100 described herein. Memory unit 124 may take the form of volatile or non-volatile memory including, without limitation, magnetic media, optical media, RAM, ROM, removable media, or any other suitable memory component.

Server system 106 may facilitate making computing resources on hosts 110 available over a network (which may or may not be network 104a) and may manage the provision of computing resources on hosts 110 to other computing systems over the network. For example, server system 106 may control access to and rationing of computing resources on hosts 110 to other computing systems over a network.

Server system 106 may be operable to access or otherwise communicate with a storage unit 108. In some embodiments, for example, server system 106 communicates with storage unit 108 over network 104b. Storage unit 108 may take the form of volatile or non-volatile memory including, without limitation, magnetic media, optical media, RAM, ROM, removable media, or any other suitable memory component. In certain embodiments, a database, such as one or more SQL servers, relational databases, or any other appropriate data structure, may be stored on storage unit 108. Storage unit 108 may be a part of or distinct from memory unit 124 of server system 106.

Storage unit 108 may store a variety of information and applications that may be used by server system 106, hosts 110, or other suitable components of system 100. In the illustrated example, storage unit 108 may store logic 134, virtual machine lifetime data 136, host status data 138, and requests 126, each of which are described in greater detail below. Although storage unit 108 is described as including this particular information and applications, storage unit 108 may store any other suitable information and applications. Furthermore, although these particular information and applications are described as being stored in storage unit 108, the present description contemplates storing this particular information and applications in any suitable location, according to particular needs.

Hosts 110 may include any suitable computing resources that may be made available over a network (which may or may not be network 104a). Hosts 110 may be communicatively coupled to network 104b and may include any suitable combination of hardware, firmware, and software. As just a few examples, hosts 110 may include any suitable combination of applications, power, processors, storage, and any other suitable computing resources that may be made available over a network. Hosts 110 may each be substantially similar to one another or may be heterogeneous. As described above, entities accessing computing services provided by provisioned computing resources environment 112 may gain access to a suite of elastic IT infrastructure services (e.g., computing resources on hosts 110) as the entity requests those services. Provisioned computing resources environment 112 may provide a scalable, reliable, and secure distributed computing infrastructure. Herein "available" computer resources include computer resources that are currently available to be provisioned, computer resources that are currently in use but may become available for provisioning in the future, or computer resources that may be added to a pool of available computer resources and become available for provisioning in the future.

In some embodiments, each host 110 may include a hypervisor program (not illustrated) that effectuates one or more virtual machines 128 on host 110. In some embodiments, each virtual machine 128 includes an operating system called a guest operating system. The hypervisor of host 110 may control how the guest operating system running on a virtual machine 128 interacts with the hardware of host 110 by virtualizing hardware interfaces. For example, when a program (e.g., the guest operating system) attempts to access a memory location mapped to a register of a device (e.g., network interface card, graphics card, etc.) or a memory mapped device, the hypervisor may intercept the access and pass the values that the program attempted to write to an associated emulator. The emulator may determine how the hardware device would respond to the access and the hypervisor takes an equivalent action on behalf of virtual machine 128. The hypervisor also may expose physical processors as virtual processors to virtual machine 128. The virtual processors may be mapped to physical processors of host 110 such that when a guest operating system schedules a thread on a virtual processor, the hypervisor schedules it on a physical processor of host 110. These example implementations of VMs 128 are provided for example purposes only.

In the illustrated example, each host 110 comprises a processing unit 130 and a memory unit 132. Processing unit 130 may include one or more microprocessors, controllers, or any other suitable computing devices or resources. Processing unit 130 may work, either alone or with other components of system 100, to provide a portion or all of the functionality of system 100 described herein. Memory unit 132 may take the form of volatile or non-volatile memory including, without limitation, magnetic media, optical media, RAM, ROM, removable media, or any other suitable memory component. In certain embodiments, a portion or all of memory unit 132 may include a database, such as one or more structured query language (SQL) servers or relational databases.

In certain embodiments, memory unit 132 may be internal or external to processing unit 130 and may include one or more instruction caches or one or more data caches. Instructions in the instruction caches may be copies of instructions in memory unit 132 or storage unit 108, and the instruction caches may speed up retrieval of those instructions by processing unit 130. Data in the data caches may include any suitable combination of copies of data in memory unit 132 or storage unit 108 for instructions executing at processing unit 130 to operate on; the results of previous instructions executed at processing unit 130 for access by subsequent instructions executing at processing unit 130, or for writing to memory unit 132 or storage unit 108; and other suitable data. The data caches may speed up read or write operations by processing unit 130.

Logic 134 may comprise any suitable combination of hardware, firmware, and software. Logic 134 may handle any function or method described herein including analyzing requests 126, determining a probable virtual machine lifetime for a requested virtual machine, and determining a particular host 110 on which to instantiate the requested virtual machine. In certain embodiments, logic 134 may be a part of a larger application for monitoring or otherwise managing the provision of hosts 110 over a network.

Request 126 may include any indication from user system 102 for a virtual machine. In some embodiments, request 126 may indicate a configuration or type of a physical machine. In other embodiments, request 126 may indicate a configuration or type of a particular virtual machine 128 to be instantiated on a host 110. For example, request 126 may indicate that a virtual machine 128 is to be instantiated that runs a particular operating system and one or more particular applications, such as a web server. As another example, request 126 may indicate that a virtual machine 128 is to be instantiated that has a particular computing and/or memory capacity. In some embodiments, request 126 may additionally include an indication from user system 102 of an expected lifetime for the requested virtual machine. For example, a user may indicate in request 126 that the requested virtual machine will be used for one week. While some embodiments of request 126 may include an expected lifetime of the requested virtual machine, other embodiments may allow a user to omit providing such information in request 126.

Figure 2:
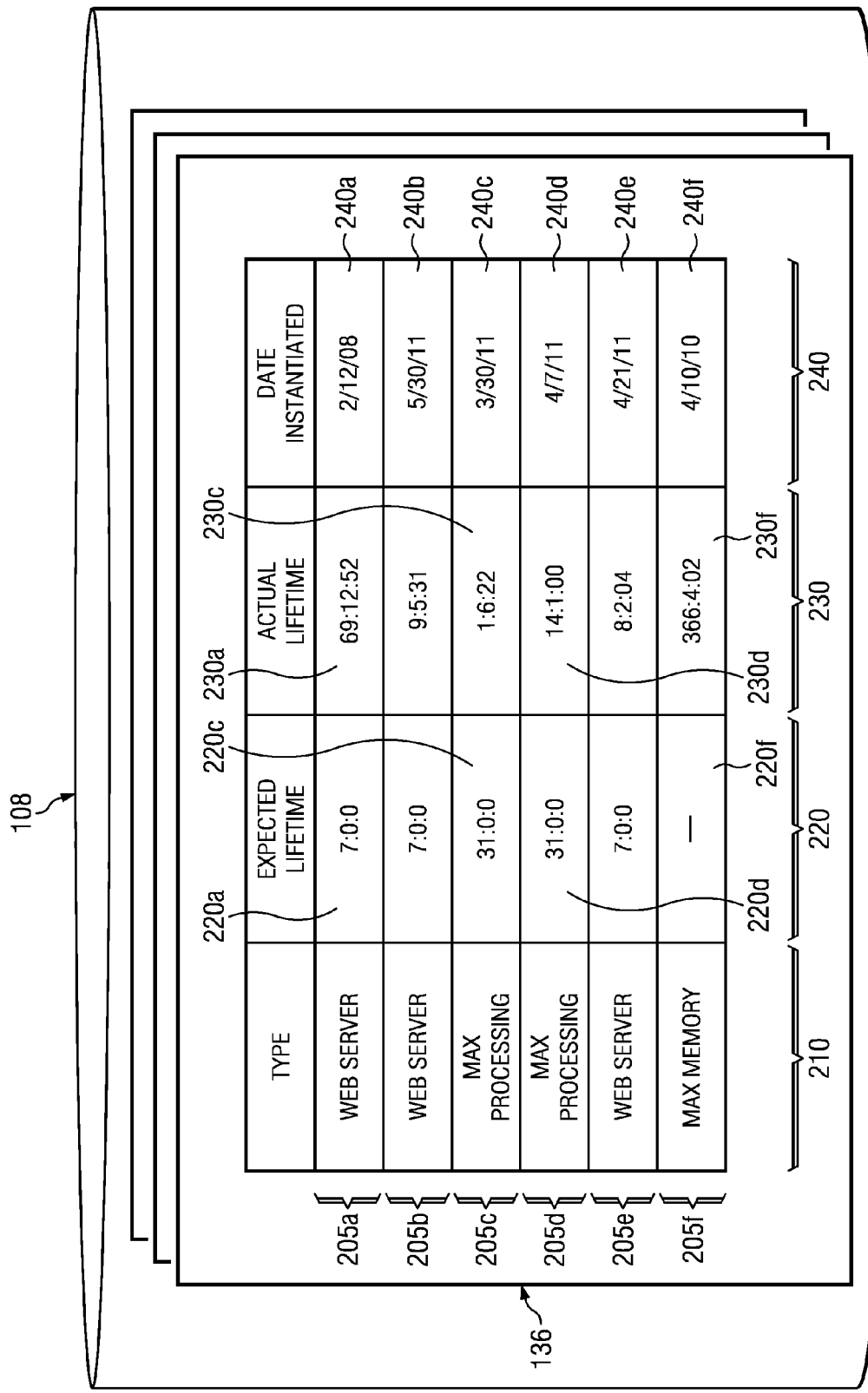
FIG. 2 illustrates example virtual machine lifetime data, which may be utilized by the example system of FIG. 1 to determine probable virtual machine lifetimes according to certain embodiments of the present disclosure.

Virtual machine lifetime data 136 may include historical data regarding prior instantiations of virtual machines. In some embodiments, virtual machine lifetime data 136 may be grouped into records according to entities such as users. For example, FIG. 2 illustrates an embodiment of virtual machine lifetime data 136 for a particular entity who has requested instantiations of virtual machines in the past. In the particular illustrated embodiment of FIG. 2, virtual machine lifetime data 136 includes entries 205a-205f, a type 210, an expected lifetime 220, an actual lifetime 230, and a date instantiated 240. Type 210 is an indication or a label of a particular configuration of the prior virtual machine (e.g., a particular purpose for the prior virtual machine, a particular application the prior virtual machine was used for, an indication of the processing power of the prior virtual machine, a memory configuration of the prior virtual machine, and the like). Expected lifetime 220 is a recording of an indication that was included in request 126 of how long the user expected the requested virtual machine to be operational. In some embodiments, expected lifetimes 220 may be recorded in virtual machine lifetime data 136 at any point after a request 126 is received and the requested virtual machine is instantiated on a host 110. Actual lifetime 230 is an indication of how long a virtual machine was actually operational on host 110 before it was terminated. In some embodiments, actual lifetime 230 may be recorded in virtual machine lifetime data 136 at any point after a virtual machine is terminated from running on a host 110. Date instantiated 240 is a date and/or time that the virtual machine of entry 205 was instantiated on host 110.

Each entry 205 includes information about a prior virtual machine that was instantiated on a host 110. As an example, entry 205a indicates that a prior virtual machine having a type 210a of "web server" was instantiated on Feb. 12, 2008 (as indicated by date instantiated 240a). Entry 205a also indicates that the prior virtual machine of entry 205a had an expected lifetime 220a of seven days, but had an actual lifetime 230a of sixty-four days, twelve hours, and fifty-two minutes. As another example, entry 205f indicates that a prior virtual machine having a type 210f of "max memory" was instantiated on Apr. 10, 2010 (as indicated by date instantiated 240f). Entry 205f also indicates that the prior virtual machine of entry 205f did not have an expected lifetime 220f in request 126 (e.g., the user chose not to indicate an expected lifetime in request 126) and had an actual lifetime 230f of 366 days, four hours, and two minutes. While virtual machine lifetime data 136 in FIG. 2 illustrates expected lifetimes 220 and actual lifetimes 230 in a particular format, the disclosure anticipates expected lifetimes 220 and actual lifetimes 230 in any suitable data format.

Turning back to FIG. 1, host status data 138 may include any data regarding hosts 110, including, but not limited to, virtual machines 128 that are currently running (i.e., operational) on hosts 110. For example, host status data 138 may indicate for each host 110 every virtual machine 128 that is currently running on the host 110. In certain embodiments, host status data 138 may include an amount of time each virtual machine 128 has been running and/or a date in which each current virtual machine 128 was instantiated on a host 110. In certain embodiments, host status data 138 may include an expected lifetime for each virtual machine 128 currently running on a host 110. In some embodiments, host status data 138 may indicate a current state of each host 110. For example, host status data 138 may indicate whether each host 110 is currently in a state in which no new virtual machines 128 may be instantiated on the host 110. For example, a particular host 110 may need to be taken offline, as described above, and thus an appropriate state to indicate this condition may be recorded in host status data 138 for the particular host 110. In some embodiments, a particular host 110 or server system 106 may determine that the particular host 110 is in a state in which no new virtual machines 128 should be instantiated on the particular host 110 based on a determination of how much RAM the particular host 110 has allocated to virtual machines 128, how much of the available processor cycles are used to run virtual machines 128 over a given time period (e.g., five minutes), and/or how much network traffic the particular host 110 must handle on behalf of virtual machines 128.

In operation of an example embodiment of system 100, server system 106 may receive via network 104*a* a request 126 from user system 102 for a virtual machine. In some embodiments, for example, request 126 may be for a particular type of virtual machine 128 to be instantiated on hosts 110. Provisioned computing resources environment 112 may access request 126 and determine that a particular user is requesting the instantiation of a particular type of virtual machine on hosts 110. In some embodiments, computing resources environment 112 may determine from request 126 whether the user has indicated an expected lifetime for the requested virtual machine.

In some embodiments, computing resources environment 112 may access virtual machine lifetime data 136 in order to determine a probable lifetime for the requested virtual machine of request 126. In certain embodiments, computing resources environment 112 may access virtual machine lifetime data 136 associated with the user who submitted request 126. As an illustration, assume virtual machine lifetime data 136 of FIG. 2 is associated with a particular user who submitted request 126. As indicated by entries 205*a*-205*f*, six virtual machines were instantiated for the particular user in the past. As described in more detail below, the information in virtual machine lifetime data 136 may be used in various ways by computing resources environment 112 to determine a probable lifetime for the requested virtual machine of request 126.

In certain embodiments, an average of actual lifetimes 230 of virtual machine lifetime data 136 may be used by computing resources environment 112 to determine a probable lifetime for a requested virtual machine. As one example, certain embodiments may average all of actual lifetimes 230 for a particular user in order to determine a probable lifetime for a requested virtual machine. In the illustrated embodiment of FIG. 2, an average of actual lifetimes 230*a*-230*f* may be calculated by simply adding lifetimes 230*a*-230*f* together and dividing by six. This would result in an average actual lifetime which may then be used as the determined probable lifetime for the requested virtual machine.

In some embodiments, a weighted average of actual lifetimes 230 may be determined and used by computing resources environment 112 for the probable lifetime of a requested virtual machine. As one example, computing resources environment 112 may place more weight on more recent entries 205 of virtual machine lifetime data 136. In the illustrated embodiment, for instance, computing resources environment 112 may place the most weight on entry 205*b* since date instantiated 240*b* indicates it is the most recent virtual machine, and the least weight on entry 205*a* since date instantiated 240*a* indicates it is the oldest virtual machine. That is, certain embodiments may rank entries 205 by their respective date instantiated 240 (e.g., from most recent to oldest) and then weight actual lifetimes 230 accordingly. Once entries 205 have been ranked and actual lifetimes 230 have been weighted, a weighted average of actual lifetimes 230 may be calculated and used as the determined probable lifetime for the requested virtual machine.

In certain embodiments, computing resources environment 112 may determine a probable virtual machine lifetime based on the type of instance. For example, as discussed above, request 126 may indicate a particular type of virtual machine that is to be instantiated on hosts 110. Example types include a particular application for the requested instance (e.g., a web server), a particular operating system (e.g., LINUX, WINDOWS, etc.), a particular processing or memory capacity, and the like. Computing resources environment 112 may determine from request 126 the type of virtual machine being requested and compare the determined type to types 210 of virtual machine lifetime data 136. As an illustration, if it is determined from request 126 that a virtual machine of type "web server" is being requested by a particular user, computing resources environment 112 may analyze virtual machine lifetime data 136 to determine if any entries 205 include a type 210 of "web server." In the illustrated embodiment, for example, computing resources environment 112 may determine that entries 205*a*, 205*b*, and 205*e* have types 210 of "web server" and therefore are more reliable to use to determine a probable lifetime for the requested virtual machine. Once particular entries 205 are selected based on comparing their respective type 210 to the type of virtual machine in request 126, actual lifetimes 230 of the selected entries 205 may be used to calculate a probable lifetime for the requested virtual machine. As discussed above, for example, a simple average or a weighted average of actual lifetimes 230 of the selected entries 205 may be used to calculate a probable lifetime for the requested virtual machine.

In some embodiments, as discussed above, request 126 may include an indication of an expected lifetime for the requested virtual machine. In some embodiments, the indication of an expected lifetime for the requested virtual machine in request 126 may be additionally/alternatively used by computing resources environment 112 for the probable lifetime of a requested virtual machine. For example, certain embodiments may merely use the indicated expected lifetime in request 126 for the probable virtual machine lifetime of the requested virtual machine without further analyzing virtual machine lifetime data 136. Other embodiments, however, may utilize both virtual machine lifetime data 136 and the indicated expected lifetime in request 126 to determine the probable virtual machine lifetime of the requested virtual machine. For example, certain embodiments may utilize virtual machine lifetime data 136 to determine the accuracy of the indicated expected lifetime in request 126 before using the indicated expected lifetime in request 126 for the probable virtual machine lifetime.

To illustrate this, consider a request 126 having an indication of an expected lifetime of "31 days" for a requested virtual machine of type "max processing." Computing resources environment 112 may analyze virtual machine lifetime data 136 and determine that there were two prior instantiations of "max processing" virtual machines (i.e., entries 205c and 205d) and that an expected lifetime of 31 days (i.e., expected lifetimes 220c and 220d) was previously indicated for each prior instantiation. Computing resources environment 112 may also compare expected lifetimes 220 with actual lifetimes 230 for the two prior instantiations of "max processing" virtual machines to determine the accuracy of expected lifetimes 220. In this example, computing resources environment 112 may determine that the difference between expected lifetime 220c (31 days) and actual lifetime 230c (approximately one day), and the difference between expected lifetime 220d (31 days) and actual lifetime 230d (approximately fourteen days), is greater than a predetermined limit and therefore determine that the indicated expected lifetime in request 126 is not accurate. Computing resources environment 112 may therefore determine that the indicated expected lifetime in request 126 is unreliable and thus decide to not utilize the indicated expected lifetime in request 126 to determine the probable lifetime of the requested virtual machine. If, however, the difference between an expected lifetime 220 and an actual lifetime 230 for an appropriate entry 205 is less than a predetermined limit, computing resources environment 112 may determine that an indicated expected lifetime in request 126 is accurate and therefore may be used for the probable lifetime of the requested virtual machine.

In certain embodiments, a determined probable virtual machine lifetime for a requested virtual machine of request 126 may be utilized in order to determine an appropriate host 110 on which to instantiate the requested virtual machine. This offers numerous advantages over prior systems that may randomly instantiate virtual machines on host systems. As one example, a host 110 having virtual machines with similar current lifetimes to the determined probable virtual machine lifetime may be selected for the instantiation of the requested virtual machine. In another example, a host 110 that is to be taken offline may be selected to instantiate requested virtual machines having only short-term probable virtual machine lifetimes. These and other example embodiments of selecting a host 110 on which to instantiate the requested virtual machine based on the determined probable virtual machine lifetime are discussed in more detail below.

In certain embodiments, selecting a particular host 110 on which to instantiate a requested virtual machine may include choosing a host 110 that has current virtual machines 128 with similar current lifetimes to the determined probable virtual machine lifetime. For example, computing resources environment 112 may access host status data 138 and determine lifetimes for each running virtual machine 128 on hosts 110. Computing resources environment 112 may then select a host 110 that has current virtual machines 128 with similar lifetimes to the determined probable virtual machine lifetime. As one example, if the determined probable virtual machine lifetime is determined to be seven days, a particular host 110 may be selected that has current virtual machines 128 having current virtual machine lifetimes of all less than seven days. In some embodiments, computing resources environment 112 may utilize expected virtual machine lifetimes in host status data 138 and determine a time when all current virtual machines 128 on a particular host 110 are expected to end. Computing resources environment 112 may then instantiate a requested virtual machine on the particular host that has a probable virtual machine lifetime that will end before or substantially close to the determined time when all current virtual machines 128 on the particular host 110 are expected to end. As a result, a provisioned computing environment provider may have more visibility into when the particular host 110 will be available to be taken offline.

In some embodiments, selecting a particular host 110 on which to instantiate a requested virtual machine may include analyzing a current state of hosts 110. For example, computing resources environment 112 may determine one or more hosts 110 that have sufficient available processing resources and/or memory resources to instantiate a virtual machine 128. As another example, computing resources environment 112 may access host status data 138 and determine states of available hosts 110. As described above, this may include a state where a particular host 110 is to be taken offline and/or is in a maintenance state. If host status data 138 indicates that a particular host 110 is to be taken offline and/or is in a maintenance state, computing resources environment 112 may determine that only virtual machines with relatively short probable lifetimes may be instantiated on the particular host. For example, a predetermined lifetime limit may be configured in computing resources environment 112 to indicate what is considered a short-term lifetime. If the determined probable virtual machine lifetime is within the predetermined limit, it may be considered a short-term lifetime and therefore the requested virtual machine may be instantiated on the particular host 110. If, however, the determined probable virtual machine lifetime is not within the predetermined limit, it may be considered a long-term lifetime and therefore the requested virtual machine may be prevented from being instantiated on the particular host 110. As a result, unused resources of a host 110 that is to be taken offline may be utilized without further delaying when the host 110 may be taken offline.

In some embodiments, selecting a particular host 110 on which to instantiate a requested virtual machine may include identifying that the type of virtual machine being requested in request 126 is a "spot instance" and selecting an appropriate host 110 for the requested spot instance. A spot instance may refer to a type of a virtual machine for which price fluctuates based on supply and demand and may be desirable to some users who have more flexibility (e.g., who do not have requirements for when a particular virtual machine is instantiated). For example, a user whose bids exceed a certain price may gain access to the available spot instance until the user is outbid (i.e., the price for the spot instance becomes greater than the user's bid). In some embodiments, computing resources environment 112 may, in response to identifying that the type of virtual machine being requested in request 126 is a spot instance, access host status data 138 and determine a particular host 110 that is to be taken offline and/or is in a maintenance state. Computing resources environment 112 may then instantiate the requested spot instance on the particular host 110, thereby utilizing resources of a host 110 that would otherwise go unused. In some embodiments, computing resources environment 112 may, in response to identifying that the type of virtual machine being requested in request 126 is a spot instance, access host status data 138 and determine a particular host 110 that includes older or otherwise undesirable hardware. Computing resources environment 112 may then instantiate the requested spot instance on the particular host 110 having undesirable hardware, thereby utilizing resources of a host 110 that would otherwise be unwanted.

In some embodiments, selecting a particular host 110 on which to instantiate a requested virtual machine may include preventing the instantiation of more than one long-term virtual machines on a single host 110. For example, computing resources environment 112 may access host status data 138 and determine lifetimes for each running virtual machine 128 on hosts 110. Computing resources environment 112 may then select a host 110 that does not have any long-term virtual machines 128 if the determined probable virtual machine lifetime is determined to be long-term. As described above, the determined probable virtual machine lifetime may be considered a long-term lifetime if it is not within a predetermined limit. As a result, computing resources environment 112 may ensure that only a single long-term virtual machine 128 may be instantiated on a single host 110 at any given time, thereby increasing the odds that the host 110 is not tied up indefinitely.

Figure 3:
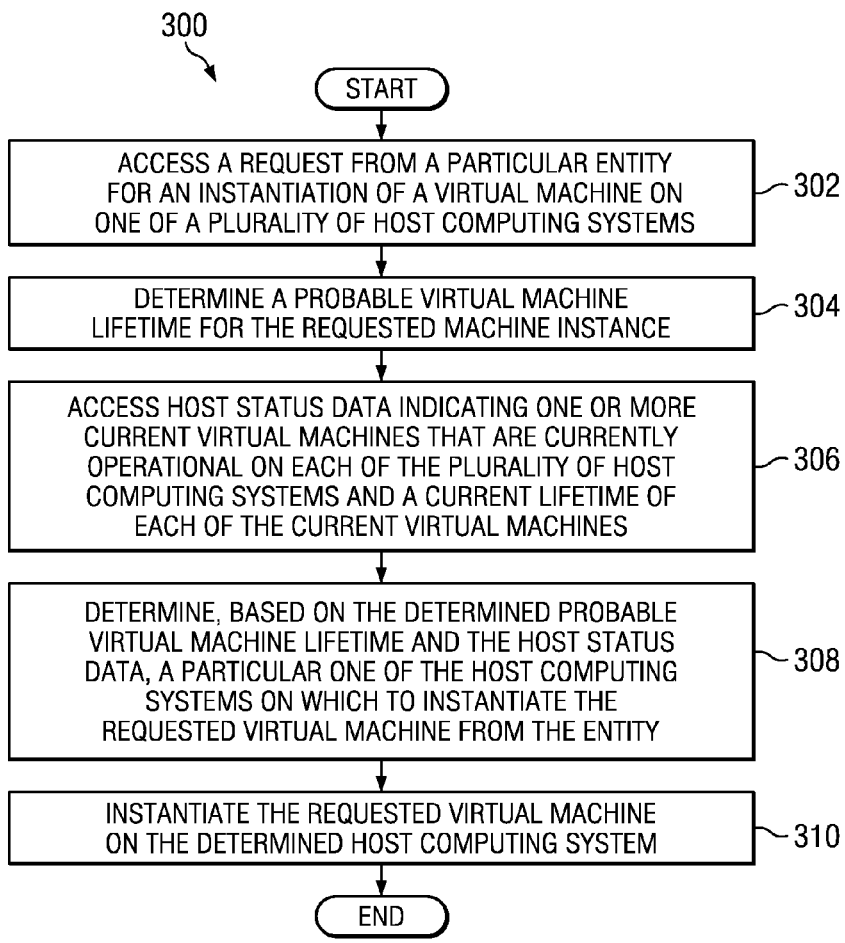
FIG. 3 illustrates an example method for determining probable virtual machine lifetimes and selecting a host computer system on which to instantiate virtual machines based on determined probable virtual machine lifetimes, which may be performed by the example system of FIG. 1 according to certain embodiments of a present disclosure.

FIG. 3 illustrates an example method 300 for determining probable virtual machine lifetimes and selecting a host computer system on which to instantiate virtual machines based on determined probable virtual machine lifetimes, which may be performed by the example system of FIG. 1 according to certain embodiments of a present disclosure. The method may be implemented in any suitable combination of software, firmware, and hardware. Although particular components may be identified as performing particular steps, the present disclosure contemplates any suitable components performing the steps according to particular needs.

At step 302, a request from a particular entity for an instantiation of a virtual machine on one of a plurality of host computing systems is accessed. In some embodiments, the accessed request is request 126 described above and may include a desired configuration or type of a particular virtual machine to be instantiated on hosts 110. In some embodiments, the accessed request may include an indication of an expected lifetime of the requested virtual machine. In some embodiments, the user selection data is accessed by any appropriate system of a provisioned computing resources environment such as one or more computer systems 107 of server system 106 or hosts 110 described above. In some embodiments, the computing system resources that are available over a communication network refer to computing system resources of hosts 110 described above.

At step 304, a probable virtual machine lifetime for the requested virtual machine of step 302 is determined. The probable virtual machine lifetime for the requested virtual machine may be determined in step 302 using any technique described above. For example, the probable virtual machine lifetime for the requested virtual machine of step 302 may be determined using an indication from the accessed request of step 302 of an expected lifetime of the requested virtual machine, as described above. In some embodiments, the probable virtual machine lifetime for the requested virtual machine of step 302 is determined based on virtual machine lifetime data such as virtual machine lifetime data 136. In such embodiments, step 304 includes accessing virtual machine lifetime data that includes one or more prior virtual machines. In some embodiments, the accessed virtual machine lifetime data of step 304 is associated with a particular entity. In some embodiments, the accessed virtual machine lifetime data of step 304 includes an actual lifetime for each of the one or more prior virtual machines, where each actual lifetime indicates an amount of time that an associated prior virtual machine was operational.

In some embodiments, the probable virtual machine lifetime is determined in step 304 by determining an average or a weighted average of actual lifetimes of one or more prior virtual machines as indicated in the accessed virtual machine lifetime data. Some embodiments may in step 304 compare actual lifetimes with prior expected lifetimes as indicated in the accessed virtual machine lifetime data and determine, based on the comparison, whether an indication of an expected lifetime is accurate. If it is determined in step 304 that the indication of an expected lifetime is accurate, it may be used for the probable virtual machine lifetime. If, however, it is determined in step 304 that the indication of an expected lifetime is not accurate, it may not be used for the probable virtual machine lifetime.

In step 306, host status data may be accessed. In some embodiments, the accessed host status data of step 306 may refer to host status data 138 described above and may indicate one or more virtual machines that are currently operational on each of the plurality of host computing systems. In some embodiments, the accessed host status data of step 306 may indicate a current lifetime of each of the virtual machines that are currently operational on each of the plurality of host computing systems. In some embodiments, the accessed host status data of step 306 may indicate a state of each of the plurality of host computing systems. For example, the accessed host status data of step 306 may indicate whether the plurality of host computing systems are in a maintenance state and/or are about to be taken offline.

In step 308, it is determined, based on the determined probable virtual machine lifetime of step 304 and the accessed host status data of step 306, a particular one of the host computing systems on which to instantiate the requested virtual machine of step 302. For example, step 308 may include choosing a host computing system having current virtual machines with similar current lifetimes to the determined probable virtual machine lifetime of step 304. In some embodiments, this may be determined from the accessed host status data of step 306. As another example, step 308 may include choosing a host computing system currently in a maintenance state if the determined probable virtual machine lifetime of step 304 is determined to be a short-term lifetime as described above. As yet another example, step 308 may include choosing a host computing system not having any long-term current lifetimes if it is determined that the determined probable virtual machine lifetime of step 304 is a long-term lifetime as described above.

In step 310, the requested virtual machine of step 302 is instantiated on the determined host computing system of step 308. After step 310, method 300 ends.

In certain embodiments, the above-described method may be performed in response to a user request (e.g., from user system 102). In some embodiments, for example, method 300 may be performed in response to request 126 from user system 102 for computing system resources on hosts 110. In some embodiments, method 300 may be performed in response to any other appropriate event. For example, some embodiments may perform method 300 in response to computer system resources on a particular host 110 becoming available. The disclosure contemplates method 300 being performed at any appropriate time after receiving request 126.

Figure 4:
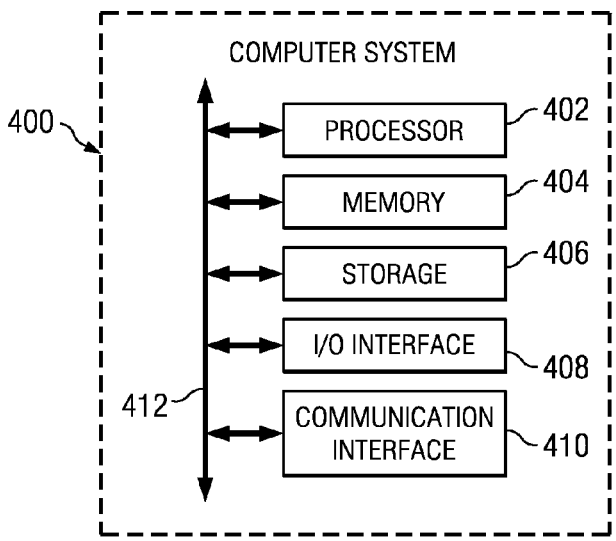
FIG. 4 illustrates an example computer system that may be used for one or more portions of the example system of FIG. 1, according to certain embodiments of the present disclosure.

FIG. 4 illustrates an example computer system 400 that may be used for one or more portions of the example system 100 of FIG. 1, according to certain embodiments of the present disclosure. For example, portions or all of user system 102, server system 106, storage unit 108, and hosts 110 may be implemented using all of the components, or any appropriate combination of the components, of computer system 400 described below. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. The present disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. The present disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes RAM. This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes ROM. Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a PAN, a LAN, a WAN, a MAN, or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system, comprising:
one or more memory units; and
one or more processing units coupled to the one or more memory units, the one or more memory units including executable instructions that upon execution by the one or more processing units cause the system to:
access a request from a particular entity for an instantiation of a virtual machine on one of a plurality of host computing systems;
determine a probable virtual machine lifetime for the requested virtual machine, the probable virtual machine lifetime comprising a probable amount of time the requested virtual machine will be operational;
access host status data indicating one or more current virtual machines that are currently operational on each of the plurality of host computing systems and a current lifetime of each of the current virtual machines;
determine, based at least in part on the determined probable virtual machine lifetime and the host status data, a particular one of the host computing systems on which to instantiate the requested virtual machine from the entity; and
instantiate the requested virtual machine on the determined host computing system.

2. The system of claim 1, the one or more memory units further comprising instructions that upon execution by the one or more processing units cause the system to access virtual machine lifetime data comprising:
an identification of one or more prior virtual machines; and
actual lifetime data for the one or more prior virtual machines, the actual lifetime data indicating an amount of time that an associated prior virtual machine was operational.

3. The system of claim 2, wherein the instructions that upon execution by the one or more processing units cause the system to determine the probable virtual machine lifetime use a weighted average of the actual lifetimes of the one or more prior virtual machines to determine the probable virtual machine lifetime.

4. The system of claim 2, wherein:
the request from the particular entity for the instantiation of a virtual machine comprises an indication of an expected lifetime of the virtual machine; and
the instructions that upon execution by the one or more processing units cause the system to determine the probable virtual machine lifetime use the indication from the entity of the expected lifetime of the virtual machine.

5. The system of claim 4, wherein:
the virtual machine lifetime data further comprises information that identifies prior expected lifetimes from the entity for each of the one or more prior virtual machines; and
using the indication from the entity of the expected lifetime of the virtual machine to determine the probable virtual machine lifetime comprises comparing the actual lifetime data for a prior virtual machine with the information that identifies prior expected lifetimes and determining, based on the comparison, whether the indication from the entity of an expected lifetime of the virtual machine is accurate.

6. The system of claim 2, wherein:
the virtual machine lifetime data further comprises a type of each of the one or more prior virtual machines; and
determining the probable virtual machine lifetime comprises comparing the requested virtual machine from the entity with the prior virtual machines based at least in part on the type information.

7. The system of claim 1, wherein determining the particular one of the host computing systems on which to instantiate the requested virtual machine comprises choosing a host computing system having current virtual machines with similar current lifetimes to the determined probable virtual machine lifetime.

8. A computer-implemented method, comprising:
accessing, by one or more computer systems, a request to instantiate a virtual machine from a user;
accessing, by the one or more computer systems, virtual machine lifetime data, the machine instance lifetime data comprising actual lifetime data for a prior virtual machine that was previously instantiated, the actual lifetime data indicating an amount of time that the prior virtual machine was operational; and
determining, by the one or more computer systems, based at least in part on the virtual machine lifetime data, a probable lifetime for the virtual machine, the probable lifetime comprising a probable amount of time the requested virtual machine will be operational.

9. The computer-implemented method of claim 8, wherein determining the probable lifetime for the virtual machine comprises utilizing a weighted average of the actual lifetime data of a plurality of prior virtual machines to determine the probable lifetime for the virtual machine.

10. The computer-implemented method of claim 8, wherein:
the request comprises an indication from the user of an expected lifetime for the virtual machine; and
determining the probable virtual machine lifetime comprises utilizing the indication from the user of the expected lifetime for the virtual machine.

11. The computer-implemented method of claim 10, wherein:
the virtual machine lifetime data further comprises information that identifies prior expected lifetimes from the user for each of the one or more prior virtual machines; and
utilizing the indication from the user of the expected lifetime for the virtual machine to determine the probable virtual machine lifetime further comprises comparing the actual lifetime data for the prior virtual machine with the information that identifies prior expected lifetimes and determining, based on the comparison, whether the indication from the entity of the expected lifetime of the virtual machine is accurate.

12. The computer-implemented method of claim 8, wherein:
- the virtual machine lifetime data further comprises type information for the one or more prior virtual machines; and
- determining the probable virtual machine lifetime comprises comparing the requested virtual machine from the user with the prior virtual machines based at least in part on the type information.

13. The computer-implemented method of claim 8, further comprising recording actual lifetime data to the virtual machine lifetime data after a particular virtual machine has been terminated.

14. A non-transitory computer-readable medium comprising software, the software when executed by one or more processing units operable to perform operations comprising:
- accessing a request from a particular entity for an instantiation of a virtual machine on one of a plurality of host computing systems;
- determining a probable virtual machine lifetime for the requested virtual machine, the probable virtual machine lifetime comprising a probable amount of time the requested virtual machine will be operational;
- accessing host status data indicating:
  - one or more current virtual machines that are currently operational on each of the plurality of host computing systems; and
  - an indication of a current lifetime of each of the current virtual machines; and
- determining, based at least in part on the determined probable virtual machine lifetime and the host status data, a particular one of the host computing systems on which to instantiate the requested virtual machine.

15. The non-transitory computer-readable medium of claim 14, wherein determining the particular one of the host computing systems on which to instantiate the requested virtual machine comprises choosing a host computing system having current virtual machines with similar current lifetimes to the determined probable virtual machine lifetime.

16. The non-transitory computer-readable medium of claim 14, wherein:
- the probable virtual machine lifetime is determined to be a short-term lifetime, the short-term lifetime being an amount of time less than a predetermined amount of time;
- the host status data further comprises an indication of whether each of the host computing systems is currently in a maintenance state; and
- determining the particular one of the host computing systems on which to instantiate the requested virtual machine comprises choosing a host computing system currently in a maintenance state.

17. The non-transitory computer-readable medium of claim 14, wherein determining the particular one of the host computing systems on which to instantiate the requested virtual machine comprises choosing a host computing system not having any long-term current lifetimes if it is determined that the determined probable virtual machine lifetime is a long-term lifetime, the long-term lifetime being an amount of time more than a predetermined amount of time.

18. The non-transitory computer-readable medium of claim 14, further comprising accessing virtual machine lifetime data comprising, the virtual machine lifetime data comprising actual lifetime data for a prior virtual machine that was previously instantiated, the actual lifetime data indicating an amount of time that the prior virtual machine was operational.

19. The non-transitory computer-readable medium of claim 18, wherein determining the probable virtual machine lifetime comprises utilizing a weighted average of the actual lifetimes of the one or more prior virtual machines for the particular entity.

20. The non-transitory computer-readable medium of claim 18, wherein the virtual machine lifetime data further comprises type information for the one or more prior virtual machines; and
- determining the probable virtual machine lifetime comprises comparing the requested virtual machine from the entity with the prior virtual machines based at least in part on the type information.

\* \* \* \* \*